(12) United States Patent
Boul et al.

(10) Patent No.: US 11,820,935 B1
(45) Date of Patent: Nov. 21, 2023

(54) METHOD AND COMPOSITION FOR SETTING A WELLBORE FLUID

(71) Applicant: Saudi Arabian Oil Company, Dhahran (SA)

(72) Inventors: Peter Boul, Houston, TX (US); Kenneth Dejuan Johnson, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/841,090

(22) Filed: Jun. 15, 2022

(51) Int. Cl.
| | |
|---|---|
| E21B 33/14 | (2006.01) |
| C09K 8/467 | (2006.01) |
| C09K 8/12 | (2006.01) |
| C04B 22/06 | (2006.01) |
| C04B 24/00 | (2006.01) |
| C04B 22/16 | (2006.01) |
| C04B 24/26 | (2006.01) |

(52) U.S. Cl.
CPC ............... *C09K 8/467* (2013.01); *C09K 8/12* (2013.01); *E21B 33/14* (2013.01); *C04B 22/06* (2013.01); *C04B 22/16* (2013.01); *C04B 24/003* (2013.01); *C04B 24/2652* (2013.01)

(58) Field of Classification Search
CPC ............................... C09K 8/467; E21B 33/14
USPC .......................................................... 166/293
See application file for complete search history.

(56) References Cited

U.S. PATENT DOCUMENTS

| | | | | |
|---|---|---|---|---|
| 3,887,009 A | * | 6/1975 | Miller | C09K 8/42 |
| | | | | 166/292 |
| 4,883,125 A | * | 11/1989 | Wilson | C04B 28/06 |
| | | | | 166/291 |
| 10,414,966 B2 | | 9/2019 | Brown et al. | |
| 2018/0273825 A1 | * | 9/2018 | Brown | C09K 8/467 |
| 2020/0165164 A1 | * | 5/2020 | Boul | C04B 24/003 |

FOREIGN PATENT DOCUMENTS

| | | |
|---|---|---|
| AU | 2015230993 B2 | 9/2015 |
| WO | 2015034543 A1 | 3/2015 |

* cited by examiner

*Primary Examiner* — Zakiya W Bates
*Assistant Examiner* — Ashish K Varma
(74) *Attorney, Agent, or Firm* — DINSMORE & SHOHL LLP

(57) ABSTRACT

A method of setting a wellbore fluid includes injecting a drilling fluid including water, cementitious material, a phosphonic acid derivative, a sulfonate acrylic acid copolymer, and zinc oxide into a wellbore; introducing sodium hexametaphosphate to the drilling fluid to form the wellbore fluid; allowing the sodium hexametaphosphate to dissolve phosphonate-calcium complexes between the phosphonic acid derivative and the cementitious material, thereby reducing the hydration time; and allowing the water and cementitious material to react, thereby curing the wellbore fluid and forming a cement.

16 Claims, 3 Drawing Sheets

METHOD AND COMPOSITION FOR SETTING A WELLBORE FLUID

TECHNICAL FIELD

The present disclosure relates to methods and compositions for setting a wellbore fluid, and more specifically, to methods and compositions for setting a wellbore fluid including cementitious material and chemical additives.

BACKGROUND

In oil and gas drilling, wellbores may be drilled into the ground to extract hydrocarbons. During the drilling process, drilling fluids may be utilized to assist with drilling of the wellbore. Drilling fluids may assist with the drilling of a wellbore in a variety of ways, such as: cooling and lubricating a drill bit, circulating drill bit cuttings away from a drill bit, preventing subsurface formation fluids from entering the wellbore while drilling, and preventing wellbore collapse. Drilling fluids can be aqueous-based or oil-based and are commonly weighted with solid particulates, such as barite. Drilling fluids with weighting agents are known to deposit a residue of the solid particulates and the drilling fluid on the wellbore wall. This is commonly referred to as a filter cake.

Cement slurries may also be used in oil and gas drilling, such as for cementing wellbores. Primary, remedial, squeeze, and plug cementing techniques can be used to place cement sheaths in an annulus between casing and well formations, for well repairs, well stability, and for well abandonment (sealing an old well to eliminate safety hazards). Cementing is typically performed by injecting a cement slurry into the well via pumps, displacing drilling fluids located within the well, and replacing them with the cement slurry. The cement slurry flows to the bottom of the wellbore through the casing. From there, the cement slurry fills in the space between the casing and the wellbore wall and hardens. This creates a seal so that outside materials cannot enter the well flow as well as permanently positions the casing in place. These cement slurries must be able to consistently perform over a wide range of temperatures and pressures, in the presence of certain corrosive chemical species, and under challenging mechanical conditions, as oil and gas wells can be located in a multitude of diverse locations. A cement slurry may be used in conditions less than 32° F. in freezing permafrost zones, and in temperatures exceeding 400° F. in geothermal wells and must be able to properly set and seal under an assortment of conditions.

SUMMARY

Proper hardening of a cement slurry can be vital to the strength and performance properties of the cured cement composition. However, conventional cement solutions may gel quickly due to the fast thickening time of the slurry, leading to poor flowability and creating concerns when handling or pumping the cement, as uniform placement of the slurry can be quite difficult. Cement slurries with an extended thickening time allow for more accurate and precise placement of the cement.

Moreover, cement slurries are often incompatible with the filter cakes left behind by most drilling fluids. Oil-based drilling fluids and their filter cakes are known to be particularly incompatible with a variety of cement slurries. The interaction of the filter cakes and cement slurries are known to cause a variety of problems, such as premature setting of the cement slurries, preventing proper placement and removal of the cement. Other problems related to the interaction can include a reduction of the homogeneity of the set cement, potentially resulting in conductive channels preventing the set cement from sealing zonal areas from subsurface formation fluid migration. Finally, a reduction in the strength of the cement as a result of the incompatibility may cause a sidewall collapse, resulting in a collapse of the wellbore.

Accordingly, a need exists for universal fluids that can act both as a flowable drilling fluid and as a settable cement slurry. Sorrel cement composed of magnesium oxychloride is one such fluid that has been proposed for this purpose. However, Sorrel cement slurries have notable drawbacks in their incompatibility with casing and water solubility. Sorrel cements have a high chloride content, which is known to rust steel such as casing pipe. Some constituents of Sorrel cement are also water soluble, resulting in a loss of mechanical strength of the cement during exposure to water.

Therefore, a need still exists for universal fluids that can act both as a flowable drilling fluid and as a settable cement slurry. The universal fluid should have good flowability and pumpability with improved retardation and an extended thickening time to avoid setting of the fluid while it is needed to act as a drilling fluid. The fluid should also be able to set as a cement when required, such as by the addition of a chemical additive. The fluid should also not corrode pipe or lose mechanical strength after exposure to water.

The present disclosure addresses this need by providing compositions and methods for applying a wellbore fluid that can act as the universal fluid previously described. This wellbore fluid has an extended initial setting time and retardation but can be activated into a settable composition upon the interaction of sodium hexametaphosphate with the remaining components of the wellbore fluid. The wellbore fluid also does not have the rusting and water solubility drawbacks because the wellbore fluid does not include magnesium oxychloride.

The present disclosure is generally directed to compositions and methods for setting a wellbore fluid while providing the aforementioned desired benefits.

In accordance with one embodiment of the present disclosure, a settable wellbore fluid includes water, cementitious material, a phosphonic acid derivative, a sulfonate acrylic acid copolymer, zinc oxide, and sodium hexametaphosphate.

In accordance with another embodiment of the present disclosure, a method includes injecting a wellbore fluid including water, cementitious material, a phosphonic acid derivative, a sulfonate acrylic acid copolymer, zinc oxide, and sodium hexametaphosphate into a wellbore, allowing the sodium hexametaphosphate to chelate the wellbore fluid, thereby reducing the hydration time and thickening the wellbore fluid, and allowing the water, cementitious material, phosphonic acid derivative, sulfonate acrylic acid copolymer, and zinc oxide to react and form a cement.

Additional features and advantages of the described embodiments will be set forth in the detailed description, which follows, and in part will be readily apparent to those skilled in the art from that description or recognized by practicing the described embodiments, including the detailed description, which follows, as well as the claims.

BRIEF DESCRIPTION OF THE DRAWINGS

The embodiments set forth in the drawings are illustrative and exemplary in nature and not intended to limit the subject matter defined by the claims. The following detailed description of specific embodiments of the present disclosure may be best understood when read in conjunction with the following drawings, where like structure is indicated with like reference numerals and in which:

DETAILED DESCRIPTION

Figure 1:
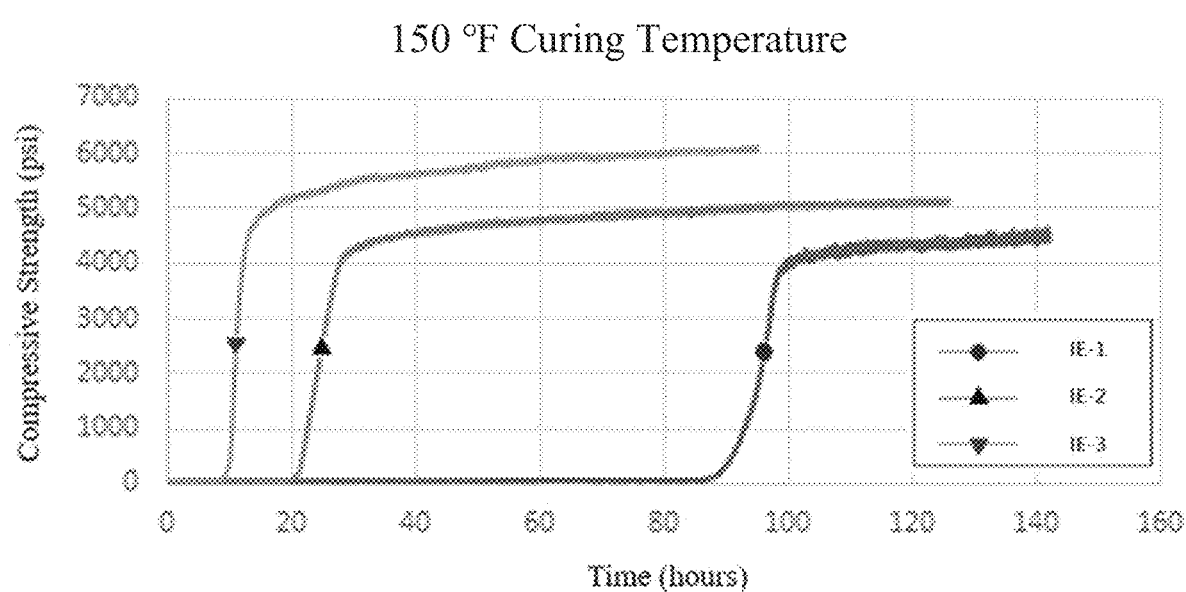
FIG. 1 graphically depicts the relationship between compressive strength and time of multiple wellbore fluids during an ultrasonic cement analyzer curing experiment in which the multiple wellbore fluids were allowed to cure at a constant temperature of 150° F.

Embodiments of the present disclosure are directed to compositions of a wellbore fluid and methods for setting a wellbore fluid.

As used throughout this disclosure, the term "curing" refers to providing adequate moisture, temperature and time to allow a wellbore fluid to achieve the desired properties (such as hardness) for its intended use through one or more reactions between water and a cementitious material.

As used throughout this disclosure, the terms "downhole" and "uphole" may refer to a position within a wellbore relative to the surface, with uphole indicating direction or position closer to the surface and downhole referring to direction or position farther away from the surface.

As used throughout this disclosure, the term "drying" refers to merely allowing a wellbore fluid to achieve a moisture condition appropriate for its intended use, which may only involve physical state changes, as opposed to chemical reactions.

As used throughout this disclosure, the term "initial setting time" refers to the point in time at which a fluid containing cementitious materials first experiences a large increase in compressive strength, corresponding to the fluid beginning to harden and cure into a set cement.

As used throughout this disclosure, the term "Newtonian viscosity" refers to the apparent viscosity of a fluid measured at a given rotor speed of a rotational viscometer. The Newtonian viscosity may be measured by multiplying the dial reading of the viscometer by 300, and dividing that product by the rotor speed in revolutions per minute.

As used throughout this disclosure, the term "retarder" refers to a chemical agent used to increase the thickening time, initial setting time, or both of a wellbore fluid to enable proper placement and use as a drilling fluid. The need for cement retardation may increase with depth due to the greater time required to complete the cementing operation and the effect of increased temperature on the cement-setting process.

As described in the present disclosure, a "subsurface formation" may refer to a body of rock that is sufficiently distinctive and continuous from the surrounding rock bodies that the body of the rock may be mapped as a distinct entity. A subsurface formation is, therefore, sufficiently homogenous to form a single identifiable unit containing similar properties throughout the subsurface formation, including, but not limited to, porosity and permeability.

As used throughout this disclosure, "wellbore," may refer to a drilled hole or borehole extending from the surface of the Earth down to the subsurface formation, including the openhole or uncased portion. The wellbore may form a pathway capable of permitting fluids to traverse between the surface and the subsurface formation. The wellbore may include at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore.

As used throughout this disclosure, a "wellbore wall" may refer to the interface through which fluid may transition between the subsurface formation and the interior of the wellbore. The wellbore wall may be unlined (that is, bare rock or formation) to permit such interaction with the subsurface formation or lined, such as by a tubular string, so as to prevent such interactions. The wellbore wall may also define the void volume of the wellbore.

As previously stated, the present disclosure is directed to compositions and methods for setting a wellbore fluid. Compositions for the wellbore fluid include water, cementitious material, a phosphonic acid derivative, a sulfonate acrylic acid copolymer, zinc oxide, and sodium hexametaphosphate.

The wellbore fluid includes water. The water may be distilled water, deionized water, or tap water. In embodiments, the water may contain additives or contaminants. For instance, the water may include freshwater or seawater, natural or synthetic brine, formation water, or salt water. In embodiments, salt or other organic compounds may be incorporated into the water to control certain properties of the water, and thus the wellbore fluid, such as density. Without being bound by any particular theory, increasing the saturation of water by increasing the salt concentration or the level of other organic compounds in the water may increase the density of the water, and thus, the wellbore fluid. In embodiments, suitable salts may include, but are not limited to, alkali metal chlorides, hydroxides, or carboxylates. Suitable salts may also include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, or combinations thereof.

In embodiments, the wellbore fluid may include from 10 wt. % to 70 wt. % by weight of cementitious material (BWOC) water. The wellbore fluid may include from 10 wt. % to 40 wt. %, from 10 wt. % to 30 wt. %, from 10 wt. % to 20 wt. %, from 20 wt. % to 40 wt. %, from 25 wt. % to 35 wt. %, or from 20 wt. % to 30 wt. % BWOC water. The wellbore fluid may contain 30 wt. % BWOC water.

The wellbore fluid also includes cementitious material. In embodiments, the cementitious material may be any suitable material which sets and hardens by reaction with water. The cementitious material may be hydraulic or non-hydraulic. A hydraulic cementitious material may refer to a mixture of limestone, clay and gypsum burned together under extreme temperatures that may begin to harden instantly or within a few minutes while in contact with water. A non-hydraulic cementitious material may refer to a mixture of lime, gypsum, plasters and oxychloride. A non-hydraulic cementitious material may take longer to harden or may require drying conditions for proper strengthening, but may often be more economically feasible. A hydraulic or non-hydraulic cementitious material may be chosen based on the desired application of the wellbore fluid of the present disclosure.

The cementitious material may include Saudi Class G cementitious material, Portland cementitious material, Portland cementitious material clinker, gypsum ($CaSO_4 \cdot 2H_2O$), siliceous fly ash, calcareous fly ash, slag cementitious material, silica fume, calcium hydroxide, silicates, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO \cdot Al_2O_3 \cdot Fe_2O_3$), sodium oxide, potassium oxide, limestone, lime (calcium oxide), hexavalent chromium, calcium aluminate, quartz, hematite, manganese tetroxide, silica sand, silica flour, or combinations thereof.

Portland cementitious material is a hydraulic cementitious material (cementitious material that not only hardens by reacting with water but also forms a water-resistant product) produced by pulverizing Portland cementitious material clinkers, which include hydraulic calcium silicates and one or more of the forms of calcium sulfate as an inter-ground addition. In embodiments, the Portland cementitious material may be Portland class G cementitious material. Saudi class G cementitious material is a combination of Portland cementitious material and crystalline silica. Crystalline silica is also known as quartz.

Silica flour is a finely ground crystalline silica with a molecular formula of $SiO_2$ and with a grain size ranging from 1 to 500 microns, from 10 to 500 microns, from 10 to 100 microns, from 10 to 80 microns, from 10 to 50 microns, from 10 to 20 microns, from 20 to 100 microns, from 20 to 80 microns, from 20 to 50 microns, from 50 to 100 microns, from 50 to 80 microns, or from 80 to 100 microns.

As previously described, in embodiments, the cementitious material may include Saudi Class G cementitious material. Saudi Class G cementitious material may include from 60 to 100 weight percent (wt. %), from 60 to 99 wt. %, from 60 to 98 wt. %, from 60 to 97 wt. %, from 60 to 96 wt. %, from 60 to 95 wt. %, from 60 to 90 wt. %, from 60 to 80 wt. %, from 60 to 70 wt. %, from 70 to 100 wt. %, from 70 to 99 wt. %, from 70 to 98 wt. %, from 70 to 97 wt. %, from 70 to 96 wt. %, from 70 to 95 wt. %, from 70 to 90 wt. %, from 70 to 80 wt. %, from 80 to 100 wt. %, from 80 to 99 wt. %, from 80 to 98 wt. %, from 80 to 97 wt. %, from 80 to 96 wt. %, from 80 to 95 wt. %, from 80 to 90 wt. %, from 90 to 100 wt. %, from 90 to 99 wt. %, from 90 to 98 wt. %, from 90 to 97 wt. %, from 90 to 96 wt. %, from 90 to 95 wt. %, from 95 to 100 wt. %, from 95 to 99 wt. %, from 95 to 98 wt. %, from 95 to 97 wt. %, from 95 to 96 wt. %, from 96 to 100 wt. %, from 96 to 99 wt. %, from 96 to 98 wt. %, from 96 to 97 wt. %, from 97 to 100 wt. %, from 97 to 99 wt. %, from 97 to 98 wt. %, from 98 to 100 wt. %, from 98 to 99 wt. %, or from 99 to 100 wt. % Portland cementitious material. Saudi Class G cementitious material may include less than 40 wt. %, less than 30 wt. %, less than 20 wt. %, less than 10 wt. %, less than 5 wt. %, less than 4 wt. %, less than 3 wt. %, less than 2 wt. %, or less than 1 wt. % crystalline silica, or quartz.

In embodiments, Saudi Class G cementitious material may have a pH of greater than 7, of from 8 to 14, of from 10 to 13, of from 11 to 13, of from 12 to 13, or of 12.4. Saudi Class G cementitious material may have a bulk density at 20° C. of from 70 to 120 pounds per cubic feet (lb/ft³), of from 80 to 110 lb/ft³, of from 90 to 100 lb/ft³, or of 94 lb/ft³. Saudi Class G cementitious material may have a solubility in water of from 0.1 to 2 grams per 100 milliliters (g/100 ml), of from 0.1 to 1 g/100 ml, of from 0.1 to 0.8 g/100 ml, of from 0.1 to 0.5 g/100 ml, of from 0.2 to 2 g/100 ml, of from 0.2 to 1 g/100 ml, of from 0.2 to 0.8 g/100 ml, of from 0.2 to 0.5 g/100 ml, of from 0.4 to 2 g/100 ml, of from 0.4 to 1 g/100 ml, of from 0.4 to 0.8 g/100 ml, of from 0.4 to 0.5 g/100 ml, of from 0.5 to 2 g/100 ml, of from 0.5 to 1 g/100 ml, of from 0.5 to 0.8 g/100 ml, or of 0.5 g/100 ml.

The wellbore fluid also includes a phosphonic acid derivative. A phosphonic acid, or phosphonate, is an organophosphorus compound containing C—$PO(OH)_2$ or C—$PO(OR)_2$ groups. In embodiments, the phosphonic acid derivative may include diethylenetriamine pentamethylphosphonic acid (DTPMP), nitrilotris(methylene) triphosphonic acid (NTMP), or both. DTPMP has a molecular formula of $C_9H_{28}N_3O_{15}P_5$. NTMP is synonymous with aminotris(methylenephosphonic acid), or ATMP. NTMP has a molecular formula of $N(CH_2PO_3H_2)_3$. In embodiments, the phosphonic acid derivative may act as a strong retarder for the wellbore fluid. Particularly, as shown herein, the phosphonic acid derivative may delay the setting time of the wellbore fluid on the order of months. The mechanism for retardation occurs by the phosphonic acid derivative precipitating on the grains of the cementitious material. This precipitation forms a phosphonic acid derivative-calcium complex with calcium ions of the cementitious material and may then thereby inhibit or poison seeding of silicon dioxide, sulfate, water nuclei within the wellbore fluid. These nuclei are commonly thought to contribute to one of the primary mechanisms of cement hydration and curing.

In embodiments, the wellbore fluid may include from 0.1 to 2 wt. %, from 0.1 to 1.5 wt. %, from 0.1 to 1.0 wt. % from 0.1 to 0.8 wt. %, from 0.1 to 0.6 wt. %, from 0.1 to 0.5 wt. % from 0.1 to 0.4 wt. %, from 0.1 to 0.3 wt. %, from 0.1 to 0.2 wt. %, 0.2 to 2 wt. %, from 0.2 to 1.5 wt. %, from 0.2 to 1.0 wt. % from 0.2 to 0.8 wt. %, from 0.2 to 0.6 wt. %, from 0.2 to 0.5 wt. % from 0.2 to 0.4 wt. %, from 0.2 to 0.3 wt. %, 0.3 to 2 wt. %, from 0.3 to 1.5 wt. %, from 0.3 to 1.0 wt. % from 0.3 to 0.8 wt. %, from 0.3 to 0.6 wt. %, from 0.3 to 0.5 wt. % from 0.3 to 0.4 wt. %, 0.4 to 2 wt. %, from 0.4 to 1.5 wt. %, from 0.4 to 1.0 wt. % from 0.4 to 0.8 wt. %, from 0.4 to 0.6 wt. %, from 0.4 to 0.5 wt. %, 0.5 to 2 wt. %, from 0.5 to 1.5 wt. %, from 0.5 to 1.0 wt. % from 0.5 to 0.8 wt. %, from 0.5 to 0.6 wt. %, 0.6 to 2 wt. %, from 0.6 to 1.5 wt. %, from 0.6 to 1.0 wt. % from 0.6 to 0.8 wt. %, 0.8 to 2 wt. %, from 0.8 to 1.5 wt. %, from 0.8 to 1.0 wt. % 1.0 to 2 wt. %, from 1.0 to 1.5 wt. %, or from 1.5 to 2.0 wt. % BWOC sulfonate acrylic acid copolymer. The wellbore fluid may include approximately 0.416 wt. % BWOC phosphonic acid derivative.

The wellbore fluid also includes a sulfonate acrylic acid copolymer. In embodiments, the sulfonate acrylic acid copolymer may include acrylamide-tert-butyl-sulfonate acrylate copolymer (ATBS/AA), ATBS-copolymers, 2-acrylamidomethylpropane-sulfonic acid copolymer (AMPS/AA), AMPS-copolymers, or combinations thereof. In embodiments, the sulfonate acrylic acid copolymer may also act as a retardant to the wellbore fluid.

In embodiments, the sulfonate acrylic acid copolymer may have a molecular weight of from 100 to 300 grams per mole (g/mol), 125 to 300 g/mol, 150 to 300 g/mol, 175 to 300 g/mol, 200 to 300 g/mol, 225 to 300 g/mol, 250 to 300 g/mol, 100 to 250 g/mol, 125 to 250 g/mol, 150 to 250 g/mol, 175 to 250 g/mol, 200 to 250 g/mol, 225 to 250 g/mol, 100 to 225 g/mol, 125 to 225 g/mol, 150 to 225 g/mol, 175 to 225 g/mol, 200 to 225 g/mol, 100 to 200 g/mol, 125 to 200 g/mol, 150 to 200 g/mol, 175 to 200 g/mol, 100 to 175 g/mol, 100 to 150 g/mol, 100 to 125 g/mol, 100 to 150 g/mol, 125 to 150 g/mol, or 100 to 125 g/mol. The sulfonate acrylic acid copolymer may have a molecular weight of 207 g/mol.

In embodiments, the wellbore fluid may include from may include from 0.1 to 2 wt. %, from 0.1 to 1.5 wt. %, from 0.1 to 1.0 wt. % from 0.1 to 0.8 wt. %, from 0.1 to 0.6 wt. %, from 0.1 to 0.5 wt. % from 0.1 to 0.4 wt. %, from 0.1 to 0.3 wt. %, from 0.1 to 0.2 wt. %, 0.2 to 2 wt. %, from 0.2 to 1.5 wt. %, from 0.2 to 1.0 wt. % from 0.2 to 0.8 wt. %, from 0.2 to 0.6 wt. %, from 0.2 to 0.5 wt. % from 0.2 to 0.4 wt. %, from 0.2 to 0.3 wt. %, 0.3 to 2 wt. %, from 0.3 to 1.5 wt. %, from 0.3 to 1.0 wt. % from 0.3 to 0.8 wt. %, from 0.3 to 0.6 wt. %, from 0.3 to 0.5 wt. % from 0.3 to 0.4 wt. %, 0.4 to 2 wt. %, from 0.4 to 1.5 wt. %, from 0.4 to 1.0 wt. % from 0.4 to 0.8 wt. %, from 0.4 to 0.6 wt. %, from 0.4 to 0.5 wt. %, 0.5 to 2 wt. %, from 0.5 to 1.5 wt. %, from 0.5 to 1.0 wt. % from 0.5 to 0.8 wt. %, from 0.5 to 0.6 wt. %, 0.6 to 2 wt. %, from 0.6 to 1.5 wt. %, from 0.6 to 1.0 wt. % from 0.6 to 0.8 wt. %, 0.8 to 2 wt. %, from 0.8 to 1.5 wt. %, from 0.8 to 1.0 wt. % 1.0 to 2 wt. %, from 1.0 to 1.5 wt. %, or from 1.5 to 2.0 wt. % BWOC sulfonate acrylic acid copolymer. The wellbore fluid may include approximately 0.416 wt. % BWOC sulfonate acrylic acid copolymer.

The wellbore fluid also includes zinc oxide. Zinc oxide is an inorganic compound with the molecular formula ZnO. In embodiments, the zinc oxide may have a molecular weight of 81.379 g/mol. In embodiments, the wellbore fluid may include from 0.1 to 1 wt. %, from 0.1 to 0.8 wt. %, from 0.1 to 0.6 wt. %, from 0.1 to 0.4 wt. %, from 0.1 to 0.2 wt. %, 0.2 to 1 wt. %, from 0.2 to 0.8 wt. %, from 0.2 to 0.6 wt. %, from 0.2 to 0.4 wt. %, 0.4 to 1 wt. %, from 0.4 to 0.8 wt. %, from 0.4 to 0.6 wt. %, 0.6 to 1 wt. %, from 0.6 to 0.8 wt. %, or from 0.8 to 1 wt. % BWOC zinc oxide. The wellbore fluid may include approximately 0.416 wt. % BWOC zinc oxide. In embodiments, the zinc oxide may also act as a retardant to the wellbore fluid.

The wellbore fluid also includes sodium hexametaphosphate. In embodiments, sodium hexametaphosphate may be a mild retardant for the setting or curing of the wellbore fluid. However, in embodiments including the phosphonic acid derivative, sodium hexametaphosphate may be an activator that transforms the wellbore fluid into a settable cement. For example, it is contemplated that phosphates and phosphonates may antagonistically compete with water and each other for binding with surface sites that contribute to the hydration and setting of cements. Particularly, sodium hexametaphosphate as a phosphate may dissolve the phosphonic acid derivative-calcium complex previously discussed. The dissolving of the complex may result in the phosphonic acid derivative no longer contributing to the retardation of the setting of the wellbore fluid. In comparison, the phosphonic acid derivative may contribute to greater retardation of the setting time of the wellbore fluid than the sodium hexametaphosphate. Therefore, the sodium hexametaphosphate dissolving the previously discussed complex may result in a large net decrease in the setting time of the wellbore fluid. As shown in the Examples and discussed in embodiments herein, this may result in a reduction in order of the setting time of the wellbore fluid from months to hours.

In embodiments, the wellbore fluid may include from 0.5 to 1 wt. %, from 0.5 to 0.9 wt. %, from 0.5 to 0.8 wt. %, from 0.5 to 0.7 wt. %, from 0.5 to 0.6 wt. %, 0.6 to 1 wt. %, from 0.6 to 0.9 wt. %, from 0.6 to 0.8 wt. %, from 0.6 to 0.7 wt. %, 0.7 to 1 wt. %, from 0.7 to 0.9 wt. %, from 0.7 to 0.8 wt. %, 0.8 to 1 wt. %, from 0.8 to 0.9 wt. %, or from 0.9 to 1.0 wt. % BWOC sodium hexametaphosphate. The wellbore fluid may include approximately 0.5 wt. % BWOC sodium hexametaphosphate. The wellbore fluid may include approximately 0.75 wt. % BWOC sodium hexametaphosphate. The wellbore fluid may include approximately 1.0 wt. % BWOC sodium hexametaphosphate.

As described in more detail herein, different embodiments of the wellbore fluid of the composition may be implemented, each containing different chemical additives for the unique situation. For example, in embodiments, the wellbore fluid may further include a dispersant. The dispersant may include polycarboxylate ether, polyunsulfonated naphthalene, synthetic sulfonated polymers, lignosulfonates with carboxylate groups, organic acids, hydroxylated sugars, or combinations thereof. In embodiments, the polycarboxylate ether may be suspended in an aqueous solution. Without being bound by any particular theory, and in embodiments, the anionic groups on the dispersant may be adsorbed on the surface of the cementitious material particles to impart a negative charge to the wellbore fluid. The electrostatic repulsion of the negatively charged cementitious material particles may allow the wellbore fluid to be dispersed and more fluid-like, improving flowability. This may allow for turbulence at lesser pump rates, reduction of friction pressure when pumping, reduction of water content, or combinations thereof.

In embodiments, the wellbore fluid may include from 0 to 1 wt. %, from 0 to 0.8 wt. %, from 0 to 0.6 wt. %, from 0 to 0.4 wt. %, from 0 to 0.2 wt. %, 0.2 to 1 wt. %, from 0.2 to 0.8 wt. %, from 0.2 to 0.6 wt. %, from 0.2 to 0.4 wt. %, 0.4 to 1 wt. %, from 0.4 to 0.8 wt. %, from 0.4 to 0.6 wt. %, 0.6 to 1 wt. %, from 0.6 to 0.8 wt. %, or from 0.8 to 1 wt. % BWOC dispersant. The wellbore fluid may include approximately 0.62 wt. % BWOC dispersant.

In embodiments, the wellbore fluid may further include a defoamer. The defoamer may be polyglycol, oleic acid, 2-octanol, or combinations thereof. In embodiments, the polyglycol may be suspended in an aqueous solution. Without being bound by any particular theory, and in embodiments, the defoamer may reduce the surface tension of gas bubbles that may be present in the wellbore fluid, thereby rupturing the bubbles and preventing foams from being formed. The minimization of foam may result in better homogeneity and mechanical strength of the wellbore fluid when it is set as a cement. The wellbore fluid may include from 0 to 0.1 wt. %, from 0 to 0.08 wt. %, from 0 to 0.06 wt. %, from 0 to 0.04 wt. %, from 0 to 0.02 wt. %, 0.02 to 0.1 wt. %, from 0.02 to 0.08 wt. %, from 0.02 to 0.06 wt. %, from 0.02 to 0.04 wt. %, 0.04 to 0.1 wt. %, from 0.04 to 0.08 wt. %, from 0.04 to 0.06 wt. %, 0.06 to 0.1 wt. %, from 0.06 to 0.08 wt. %, or from 0.08 to 0.1 wt. % BWOC defoamer. The wellbore fluid may include approximately 0.07 wt. % BWOC defoamer.

In embodiments, the wellbore fluid may include further additives in addition to those previously described. As non-limiting examples, the additional additives may include accelerators, retarders, extenders, weighting agents, fluid loss control agents, lost circulation control agents, surfactants, elastomers, fibers, or combinations thereof.

In embodiments, the fluid loss control agents may include a non-ionic cellulose derivative, hydroxyethylcellulose (HEC) (commercial name FSA-3), a non-ionic synthetic polymer, such as polyvinyl alcohol or polyethyleneimine, or combinations thereof. The fluid loss control agents may have the added benefit of modifying the rheology of the cement slurry to prevent the cement slurry from settling. In embodiments, the fluid loss control agents may include bentonite, which may additionally viscosify the wellbore fluid and may, in embodiments, cause additional retardation effects.

In embodiments, and as illustrated in the examples, the wellbore fluid may have an initial setting time at 150° F. of greater than 10 hours and less than 90 hours. The wellbore fluid may also have an initial setting time at 180° F. of greater than 4 hours and less than 32 hours. The wellbore fluid may also have an initial setting time at 220° F. of greater than 3 hours and less than 13 hours.

In embodiments, and as illustrated in the examples, the wellbore fluid may have a compressive strength at 150° F. of greater than 4400 psi and less than 6100 psi. The wellbore fluid may also have a compressive strength at 180° F. of greater than 4500 psi and less than 6100 psi. The wellbore fluid may also have an initial setting time at 220° F. of greater than 3800 psi and less than 5400 psi.

Embodiments of the present disclosure also include methods of setting the wellbore fluid. The method includes the initial step of injecting a drilling fluid into a wellbore. The drilling fluid may include any of the wellbore fluids previously described, but without sodium hexametaphosphate. The drilling fluid may also have the same properties, including but not limited to initial setting time, point of departure, compressive strength, or combinations thereof, as any of the wellbore fluids previously described. At least some time after the drilling fluid is injected, the sodium hexametaphosphate is introduced to the drilling fluid to form the wellbore fluid. Introducing the sodium hexametaphosphate to the drilling fluid allows the sodium hexametaphosphate to dissolve phosphonate-calcium complexes between the phosphonic acid derivative and the cementitious material. In embodiments, the dissolving of the phosphonate-calcium complex may then contribute to a reduction of the hydration time of the wellbore fluid. The water and cementitious material may then be allowed to react, thereby curing the wellbore fluid and forming a cement.

In embodiments, curing the wellbore fluid may refer to passively allowing time to pass under suitable conditions upon which the wellbore fluid may harden or cure through allowing one or more reactions between the water and the cementitious material. Suitable conditions may be any time, temperature, pressure, humidity, and other appropriate conditions known in the cement industry to cure a cement composition. In embodiments, suitable curing conditions may be ambient conditions. Curing may also include, but may not be limited to, actively hardening or curing the wellbore fluid by introducing a curing agent to the wellbore fluid, providing heat or air to the wellbore fluid, manipulating the environmental conditions of the wellbore fluid to facilitate reactions between the water and the cementitious materials, a combination thereof, or other such means. In embodiments, the wellbore fluid may be cured and set into a solid cement due to subsurface formation conditions, temperature, and pressure.

In embodiments, the method may further include introducing a casing string into the wellbore. The casing string may include casing pipe. The casing string may additionally include, but may not be limited to, guide shoes, centralizers, float collars, top and bottom plugs, or combinations thereof. The various components of the casing string, except for the bottom plug, may each include an inner sidewall operable to transmit a fluid uphole to downhole through a cavity defined by the inner sidewalls. In embodiments including the casing string, the casing string and a wellbore wall of the wellbore may define an annular region between the casing string and the wellbore. Following the introduction of the casing string into the wellbore, the cement may be allowed to set within the annular region.

In embodiments, the method may further include introducing a drillstem into the wellbore. The drillstem may include drill pipe and a downhole drill bit. The drillstem may additionally include drill collars, drill bit stabilizers, and other similar downhole tools used in drilling operations. The various components of the drill stem may each include an inner sidewall operable to transmit a fluid uphole to downhole through a cavity defined by the inner sidewalls. The drillstem may be rotated to cut into the rock at the bottom of a wellbore to produce drill bit cuttings. After introducing the drillstem into the wellbore, the wellbore fluid may be circulated throughout the wellbore, thereby circulating drill bit cuttings out of the wellbore. The wellbore fluid may circulate drill bit cuttings out of the wellbore by lifting the drill bit cuttings away from the drill bit and carrying the drill bit cuttings uphole. Circulating the wellbore fluid through the wellbore may include circulating the wellbore fluid downhole through the drillstem, circulating uphole through a drilling annulus defined by the exterior of the drillstem and the wellbore wall, and circulating out of the wellbore through an outlet of the wellbore. The wellbore fluid may be circulated downhole through the drillstem through the cavity defined by the inner sidewalls of the drill stem. After the wellbore fluid is circulated, the drillstem may be removed from the wellbore. Any of the casing strings previously described may then be introduced into the wellbore. The cement may then be allowed to set within the annular region.

In embodiments, the wellbore fluid may be inserted into the annular region by pumping the wellbore fluid into the cavity defined by the inner sidewalls of the casing string, to the bottom of the casing string, around the bottom of the casing string, into the annular region, or combinations thereof. Following the insertion of an appropriate amount of wellbore fluid into the inner cavity of the casing string, in embodiments, a displacement fluid may be utilized to push the wellbore fluid out of the inner cavity of the casing string and into the annular region. The wellbore fluid may then be cured or otherwise allowed to harden, thereby setting the casing string in place.

In embodiments, fluid rheology may be an important parameter of the wellbore fluid's performance as a drilling fluid. The rheological behavior of the wellbore fluid, such as gel strength, plastic viscosity, and yield point, may be determined from measurements of the viscosity, shear stress, and shear rate. A viscosity profile of a fluid often is measured with a controlled temperature and pressure rotational viscometer, such as a Fann Model 35A, commercially available from Fann Instruments (Houston, TX).

In embodiments, the rheological behavior of the wellbore fluid may be determined by measuring the shear stress on the wellbore fluid at different shear rates, which may be accomplished by measuring the shear stress or shear rate on the wellbore fluid. The various shear rates are utilized because the wellbore fluid may behave as a rigid body at lesser shear stresses but may also flow as a viscous fluid at greater shear stresses. The rheology of the wellbore fluid may be characterized by the plastic viscosity (PV) in centiPoise (cP) and the yield point (YP), which are parameters from the Bingham plastic rheology model. The PV is related to the resistance of the wellbore fluid to flow and may be due to mechanical interaction between solids of the wellbore fluid. PV may also represent the viscosity of the wellbore fluid extrapolated to infinite shear rate. The PV may reflect the type and concentration of the solids that may be in the wellbore fluid. The PV of a fluid may be estimated by measuring the shear stress of the fluid using the previously described viscometer at spindle speeds of 300 rotations per minute (RPM) and 600 RPM and subtracting the 300 RPM dial reading from the 600 RPM dial reading according to Equation 1:

$$PV(cP) = (\text{dial reading at 600RPM}) - (\text{dial reading at 300RPM}) \quad \text{Equation 1}$$

In embodiments, the wellbore fluid may have a PV of from 5 to 2000 cP. The wellbore fluid may have a PV of from 5 to 5000 cP, from 5 to 1500 cP, from 5 to 1000 cP, from 5 to 500 cP, from 5 to 200 cP, from 5 to 100 cP, from 5 to 50 cP, from 50 to 5000 cP, from 50 to 2000 cP, from 50 to 1500 cP, from 50 to 1000 cP, from 50 to 500 cP, from 50 to 200 cP, from 50 to 100 cP, from 100 to 5000 cP, from 100 to 2000 cP, from 100 to 1500 cP, from 100 to 1000 cP, from 100 to 500 cP, from 100 to 200 cP, from 200 to 5000 cP, from 200 to 2000 cP, from 200 to 1500 cP, from 200 to 1000 cP, from 200 to 500 cP, from 100 to 200 cP, from 500 to 5000 cP, from 500 to 2000 cP, from 500 to 1500 cP, from 500 to 1000 cP, from 1000 to 5000 cP, from 1000 to 2000 cP, from 1000 to 1500 cP, from 1500 to 5000 cP, from 1500 to 2000 cP, or from 2000 to 5000 cP.

In embodiments, the wellbore fluid may behave as a rigid body when the shear stress is less than the YP, and the wellbore fluid may flow as a viscous fluid when the shear stress is greater than the YP. In other words, the YP may represent the amount of stress required to move the wellbore fluid from a static condition. The YP is expressed as a force per area, such as pounds of force per one hundred square feet (lbf/100 ft$^2$), for example. In embodiments, the YP may provide an indication of the ability of the wellbore fluid to carry drill bit cuttings away from the drill bit, which in simplified terms may give an indication of the wellbore fluid's hole-cleaning ability. The YP is determined by extrapolating the Bingham plastic rheology model to a shear rate of zero. The YP may also be estimated from the PV (as measured in accordance with Equation 1, as previously described) according to Equation 2:

$$YP = (\text{dial reading at 300 RPM}) - PV \quad \text{Equation 2}$$

In embodiments, the wellbore fluid may have a YP of from 0 to 50 lbf/100 ft$^2$. In embodiments, the wellbore fluid may have a YP of from 0 to 100 lbf/100 ft$^2$, from 0 to 60 lbf/100 ft$^2$, from 0 to 40 lbf/100 ft$^2$, from 0 to 30 lbf/100 ft$^2$, from 0 to 20 lbf/100 ft$^2$, from 0 to 15 lbf/100 ft$^2$, from 0 to 10 lbf/100 ft$^2$, from 0 to 5 lbf/100 ft$^2$, from 0 to 1 lbf/100 ft$^2$, from 1 to 100 lbf/100 ft$^2$, from 1 to 60 lbf/100 ft$^2$, from 1 to 50 lbf/100 ft$^2$, from 1 to 40 lbf/100 ft$^2$, from 1 to 30 lbf/100 ft$^2$, from 1 to 20 lbf/100 ft$^2$, from 1 to 15 lbf/100 ft$^2$, from 1 to 10 lbf/100 ft$^2$, from 1 to 5 lbf/100 ft$^2$, from 5 to 100 lbf/100 ft$^2$, from 5 to 60 lbf/100 ft$^2$, from 5 to 50 lbf/100 ft$^2$, from 5 to 40 lbf/100 ft$^2$, from 5 to 30 lbf/100 ft$^2$, from 5 to 20 lbf/100 ft$^2$, from 5 to 15 lbf/100 ft$^2$, from 5 to 10 lbf/100 ft$^2$, from 10 to 100 lbf/100 ft$^2$, from 10 to 60 lbf/100 ft$^2$, from 10 to 50 lbf/100 ft$^2$, from 10 to 40 lbf/100 ft$^2$, from 10 to 30 lbf/100 ft$^2$, from 10 to 20 lbf/100 ft$^2$, from 10 to 15 lbf/100 ft$^2$, from 15 to 100 lbf/100 ft$^2$, from 15 to 60 lbf/100 ft$^2$, from 15 to 50 lbf/100 ft$^2$, from 15 to 40 lbf/100 ft$^2$, from 15 to 30 lbf/100 ft$^2$, from 15 to 20 lbf/100 ft$^2$, from 20 to 100 lbf/100 ft$^2$, from 20 to 60 lbf/100 ft$^2$, from 20 to 50 lbf/100 ft$^2$, from 20 to 40 lbf/100 ft$^2$, from 20 to 30 lbf/100 ft$^2$, from 30 to 100 lbf/100 ft$^2$, from 30 to 60 lbf/100 ft$^2$, from 30 to 50 lbf/100 ft$^2$, from 30 to 40 lbf/100 ft$^2$, from 40 to 100 lbf/100 ft$^2$, from 40 to 60 lbf/100 ft$^2$, from 40 to 50 lbf/100 ft$^2$, from 50 to 100 lbf/100 ft$^2$, from 50 to 60 lbf/100 ft$^2$, or from 60 to 100 lbf/100 ft$^2$.

EXAMPLES

The following example illustrates features of the present disclosure but is not intended to limit the scope of the disclosure.

Example 1

A base slurry, "Comparative Example," or "Comparative Example 1" was formed having a composition as shown in Table 1. The blending of the Comparative Example was performed in accordance with API recommended practices for cementing (10B-2). Comparative Examples 2 and 3 were also formed in the same manner, with Comparative Examples 2 and 3 having an identical composition to Comparative Example 1. The three Comparative Examples may each be representative of the wellbore fluid, according to one or more embodiments herein, without the sodium hexametaphosphate. Mikrodur R95®, available from Dyckerhoff, is a combination of slag cementitious material, Portland cementitious material clinker, and gypsum. PCR-3, available from Fritz Industries, is an 2-acrylamido-2-methylpropane sulfonic acid copolymer retarder with a molecular weight of 207 g/mol useful in applications with bottom hole circulating temperatures up to 250° F. in fresh water slurries. The zinc oxide was J.T. Baker® BAKER ANALYZED™ A.C.S. Reagent Acid, available from Avantor®. Dequest® 2066 is an organophosphonate available from Thermphos®. Specifically, it includes diethylenepentaamine methylenephosphonic acid and water. Ethacryl-G is an aqueous solution of polycarboxylate ether, available from Arkema®. Ethacryl-G is used as a dispersant in cementing applications.

TABLE 1

Comparative Example Composition

| Component | Amount (g) | Concentration (BWOC) |
|---|---|---|
| Mikrodur R95 | 800.42 | |
| PCR-3 | 3.33 | 0.416 wt. % |
| Zinc Oxide | 3.33 | 0.416 wt. % |
| Dequest 2066 | 3.33 | 0.416 wt. % |
| Ethacryl G | 5.00 | 0.62 wt. % |
| Water | 400.21 | 50 wt. % |

Multiple wellbore fluids, according to embodiments herein, were then formed by adding different concentrations of sodium hexametaphosphate, (SHMP) available from Aierdale Chemical, to a base slurry similar to the Comparative Example, as detailed in Tables 2-10 by Inventive Examples 1-9.

TABLE 2

Inventive Example 1 Composition

| Component | Amount (g) | Concentration (BWOC) |
|---|---|---|
| Mikrodur R95 | 797.79 | |
| PCR-3 | 3.32 | 0.416 wt. % |
| Zinc Oxide | 3.32 | 0.416 wt. % |
| Dequest 2066 | 3.32 | 0.416 wt. % |
| Ethacryl G | 4.98 | 0.62 wt. % |
| Water | 398.9 | 50 wt. % |
| SHMP | 3.99 | 0.5 wt. % |

TABLE 3

Inventive Example 2 Composition

| Component | Amount (g) | Concentration (BWOC) |
|---|---|---|
| Mikrodur R95 | 796.49 | |
| PCR-3 | 3.31 | 0.416 wt. % |
| Zinc Oxide | 3.31 | 0.416 wt. % |
| Dequest 2066 | 3.31 | 0.416 wt. % |
| Ethacryl G | 4.98 | 0.62 wt. % |
| Water | 398.25 | 50 wt. % |
| SHMP | 5.97 | 0.75 wt. % |

TABLE 4

Inventive Example 3 Composition

| Component | Amount (g) | Concentration (BWOC) |
|---|---|---|
| Mikrodur R95 | 795.19 | |
| PCR-3 | 3.31 | 0.416 wt. % |
| Zinc Oxide | 3.31 | 0.416 wt. % |
| Dequest 2066 | 3.31 | 0.416 wt. % |
| Ethacryl G | 4.97 | 0.62 wt. % |
| Water | 397.6 | 50 wt. % |
| SHMP | 7.95 | 1 wt. % |

TABLE 5

Inventive Example 4 Composition

| Component | Amount (g) | Concentration (BWOC) |
|---|---|---|
| Mikrodur R95 | 797.79 | |
| PCR-3 | 3.32 | 0.416 wt. % |
| Zinc Oxide | 3.32 | 0.416 wt. % |
| Dequest 2066 | 3.32 | 0.416 wt. % |
| Ethacryl G | 4.98 | 0.62 wt. % |
| Water | 398.9 | 50 wt. % |
| SHMP | 3.99 | 0.5 wt. % |

TABLE 6

Inventive Example 5 Composition

| Component | Amount (g) | Concentration (BWOC) |
|---|---|---|
| Mikrodur R95 | 796.49 | |
| PCR-3 | 3.31 | 0.416 wt. % |
| Zinc Oxide | 3.31 | 0.416 wt. % |
| Dequest 2066 | 3.31 | 0.416 wt. % |
| Ethacryl G | 4.98 | 0.62 wt. % |
| Water | 398.25 | 50 wt. % |
| SHMP | 5.97 | 0.75 wt. % |

TABLE 7

Inventive Example 6 Composition

| Component | Amount (g) | Concentration (BWOC) |
|---|---|---|
| Mikrodur R95 | 795.19 | |
| PCR-3 | 3.31 | 0.416 wt. % |
| Zinc Oxide | 3.31 | 0.416 wt. % |
| Dequest 2066 | 3.31 | 0.416 wt. % |
| Ethacryl G | 4.97 | 0.62 wt. % |
| Water | 397.6 | 50 wt. % |
| SHMP | 7.95 | 1 wt. % |

TABLE 8

Inventive Example 7 Composition

| Component | Amount (g) | Concentration (BWOC) |
|---|---|---|
| Mikrodur R95 | 797.79 | |
| PCR-3 | 3.32 | 0.416 wt. % |
| Zinc Oxide | 3.32 | 0.416 wt. % |
| Dequest 2066 | 3.32 | 0.416 wt. % |
| Ethacryl G | 4.98 | 0.62 wt. % |
| Water | 398.9 | 50 wt. % |
| SHMP | 3.99 | 0.5 wt. % |

TABLE 9

Inventive Example 8 Composition

| Component | Amount (g) | Concentration (BWOC) |
|---|---|---|
| Mikrodur R95 | 796.49 | |
| PCR-3 | 3.31 | 0.416 wt. % |
| Zinc Oxide | 3.31 | 0.416 wt. % |
| Dequest 2066 | 3.31 | 0.416 wt. % |
| Ethacryl G | 4.98 | 0.62 wt. % |
| Water | 398.25 | 50 wt. % |
| SHMP | 5.97 | 0.75 wt. % |

TABLE 10

Inventive Example 9 Composition

| Component | Amount (g) | Concentration (BWOC) |
|---|---|---|
| Mikrodur R95 | 795.19 | |
| PCR-3 | 3.31 | 0.416 wt. % |
| Zinc Oxide | 3.31 | 0.416 wt. % |
| Dequest 2066 | 3.31 | 0.416 wt. % |
| Ethacryl G | 4.97 | 0.62 wt. % |
| Water | 397.6 | 50 wt. % |
| SHMP | 7.95 | 1 wt. % |

Inventive Examples 1-6, 8, and 9 and Comparative Examples 1 and 2 were then individually placed in Fann 35 Viscometers and tested for plastic viscosity and yield point by recording dial deflections at increasing RPMs up to 600 and back down. Dial deflections observed are recorded in Tables 11-20. Dial deflections, were recorded, where indicated in Tables 11-20, at ambient temperature (68° F.), 150°

F., and 180° F. A recorded dial deflection of 400+ means the reading was off the observable measurement scale of the viscometer.

TABLE 11

Comparative Example 1 Viscometer Dial Readings.

| Comparative Example 1 | Ambient Temp | | 150° F. | |
|---|---|---|---|---|
| | Dial Readings (degrees) | | | |
| RPM | Up | Down | Up | Down |
| 3 | 33 | 10 | 50 | 55 |
| 6 | 62 | 9 | 68 | 61 |
| 100 | 72 | 41 | 299 | 149 |
| 200 | 117 | 84 | 338 | 261 |
| 300 | 157 | 131 | 372 | 400+ |
| 600 | 268 | | 400+ | |

TABLE 12

Comparative Example 2 Viscometer Dial Readings.

| Comparative Example 2 | Ambient Temp | | 180° F. | |
|---|---|---|---|---|
| | Dial Readings (degrees) | | | |
| RPM | Up | Down | Up | Down |
| 3 | 21 | 4 | 20 | 24 |
| 6 | 28 | 5 | 30 | 25 |
| 100 | 38 | 19 | 124 | 62 |
| 200 | 64 | 42 | 179 | 101 |
| 300 | 90 | 68 | 211 | 140 |
| 600 | 166 | | 273 | |

TABLE 13

Inventive Example 1 Viscometer Dial Readings.

| Inventive Example 1 | Ambient Temp | | 150° F. | |
|---|---|---|---|---|
| | Dial Readings (degrees) | | | |
| RPM | Up | Down | Up | Down |
| 3 | 1 | 1 | | |
| 6 | 2 | 2 | | |
| 100 | 21 | 14 | | |
| 200 | 49 | 34 | | |
| 300 | 76 | 61 | | |
| 600 | 163 | | | |

TABLE 14

Inventive Example 2 Viscometer Dial Readings.

| Inventive Example 2 | Ambient Temp | | 150° F. | |
|---|---|---|---|---|
| | Dial Readings (degrees) | | | |
| RPM | Up | Down | Up | Down |
| 3 | 2 | 2 | | |
| 6 | 2 | 2 | | |
| 100 | 15 | 12 | | |
| 200 | 33 | 27 | | |
| 300 | 54 | 47 | | |
| 600 | 117 | | | |

TABLE 15

Inventive Example 3 Viscometer Dial Readings.

| Inventive Example 3 | Ambient Temp | | 150° F. | |
|---|---|---|---|---|
| RPM | Up | Down | Up | Down |
| 3 | 3 | 23 | | |
| 6 | 3 | 15 | | |
| 100 | 35 | 47 | | |
| 200 | 71 | 70 | | |
| 300 | 106 | 97 | | |
| 600 | 225 | | | |

TABLE 16

Inventive Example 4 Viscometer Dial Readings.

| Inventive Example 4 | Ambient Temp | | 180° F. | |
|---|---|---|---|---|
| | Dial Readings (degrees) | | | |
| RPM | Up | Down | Up | Down |
| 3 | 1 | 1 | | |
| 6 | 2 | 1 | | |
| 100 | 17 | 12 | | |
| 200 | 41 | 29 | | |
| 300 | 66 | 52 | | |
| 600 | 143 | | | |

TABLE 17

Inventive Example 5 Viscometer Dial Readings.

| Inventive Example 5 | Ambient Temp | | 180° F. | |
|---|---|---|---|---|
| | Dial Readings (degrees) | | | |
| RPM | Up | Down | Up | Down |
| 3 | 9 | 1 | 9 | 4 |
| 6 | 11 | 1 | 13 | 4 |
| 100 | 35 | 13 | 210 | 55 |
| 200 | 72 | 35 | 298 | 139 |
| 300 | 107 | 69 | 295 | 235 |
| 600 | 205 | | 400+ | |

TABLE 18

Inventive Example 6 Viscometer Dial Readings.

| Inventive Example 6 | Ambient Temp | | 180° F. | |
|---|---|---|---|---|
| RPM | Up | Down | Up | Down |
| 3 | 6 | 3 | 14 | 11 |
| 6 | 7 | 3 | 18 | 12 |
| 100 | 29 | 16 | 238 | 104 |
| 200 | 62 | 40 | 350 | 260 |
| 300 | 95 | 74 | 387 | 400+ |
| 600 | 216 | | 400+ | |

TABLE 19

Inventive Example 8 Viscometer Dial Readings.

| Inventive Example 8 | Ambient Temp | | 180° F. | |
|---|---|---|---|---|
| | Dial Readings (degrees) | | | |
| RPM | Up | Down | Up | Down |
| 3 | 11 | 1 | 11 | 7 |
| 6 | 9 | 1 | 14 | 7 |
| 100 | 36 | 13 | 142 | 53 |
| 200 | 69 | 35 | 288 | 158 |
| 300 | 100 | 68 | 389 | 309 |
| 600 | 210 | | 400+ | |

TABLE 20

Inventive Example 9 Viscometer Dial Readings.

| Inventive Example 9 | Ambient Temp | | 180° F. | |
|---|---|---|---|---|
| RPM | Up | Down | Up | Down |
| 3 | 42 | 2 | 50 | 55 |
| 6 | 38 | 2 | 68 | 61 |
| 100 | 57 | 14 | 299 | 149 |
| 200 | 93 | 37 | 338 | 261 |
| 300 | 124 | 78 | 372 | 400+ |
| 600 | 237 | | 400+ | |

In Table 11, only the center of Comparative Example 1 was observed to rotate around the spindle of the viscometer at both ambient conditions and at 150° F. In Table 12, only the center of Comparative Example 1 was observed to rotate around the spindle of the viscometer at both ambient conditions and at 180° F. In Tables 13-15, viscometer data was not recorded for 150° F. because Inventive Examples 1-3 were observed to thicken during preparation and temperature scaling for the test. Also, in Table 15, the Inventive Example 3 was observed to begin to thicken at the end of the test. In Table 16, the viscometer data was not recorded for 180° F. because Inventive Example 4 was observed to thicken during preparation and temperature scaling for the test. In Tables 18 and 20, Inventive Examples 6 and 9 were observed to be considerably thicker at higher RPMs than the previously tested Examples. Also in Table 20, only the center of Inventive Example 9 was observed to rotate around the spindle of the viscometer at ambient conditions.

After recording the viscometer data, the dial deflections were converted into plastic viscosity and yield point by the methods and equations previously discussed. These measurements are recorded below in Table 21. It is contemplated that the negative yield point values may actually correlate to a yield point of zero, in that the Examples with a yield point of less than zero flow may flow as a viscous fluid even when not subjected to any shear stress.

TABLE 21

Plastic Viscosity and Yield Point Measurements for Viscometer Tests.

| | Ambient Temperature | | 150° F. | | 180° F. | |
|---|---|---|---|---|---|---|
| | Plastic Viscosity (cp) | Yield Point (lb/100 ft.$^2$) | Plastic Viscosity (cp) | Yield Point (lb/100 ft.$^2$) | Plastic Viscosity (cp) | Yield Point (lb/100 ft.$^2$) |
| Comparative Example 1 | 111 | 46 | — | — | — | — |
| Comparative Example 2 | 76 | 14 | — | — | 62 | 149 |
| Inventive Example 1 | 87 | −11 | — | — | — | — |
| Inventive Example 2 | 63 | −9 | — | — | — | — |
| Inventive Example 3 | 110 | −13 | — | — | — | — |
| Inventive Example 4 | 77 | −11 | — | — | — | — |
| Inventive Example 5 | 98 | 9 | — | — | — | — |
| Inventive Example 6 | 121 | −26 | — | — | — | — |
| Inventive Example 8 | 110 | −10 | — | — | — | — |
| Inventive Example 9 | 113 | 11 | — | — | — | — |

The Inventive Examples 1-9 and the Comparative Examples 1-3 were then tested for an initial setting time and compressive strength development over time while being cured under downhole temperature and pressure conditions, as detailed in Table 22. This compressive strength development was measured using a Chandler 4265-HT ultrasonic cement analyzer (UCA) according to API recommended practice 10B. The pressure in tests with the UCA were set to approximately 3000 psi. As previously described, and as illustrated in the Figures, the initial setting time is the point in time at which a fluid containing cementitious materials first experiences a large increase in compressive strength, corresponding to the fluid beginning to harden and cure into a set cement.

Figure 2:
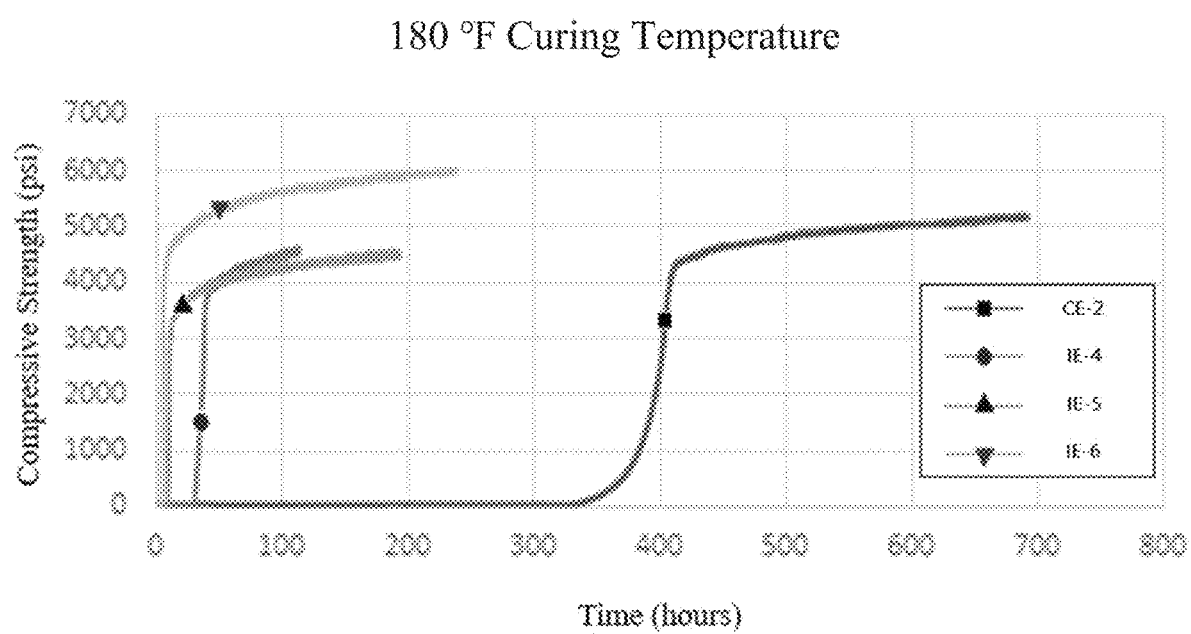
FIG. 2 graphically depicts the relationship between compressive strength and time of multiple wellbore fluids during an ultrasonic cement analyzer curing experiment in which the multiple wellbore fluids were allowed to cure at a constant temperature of 180° F.

FIG. 1 illustrates the testing of Illustrative Examples 1, 2, and 3, designated as "IE-1," "IE-2," and "IE-3" respectively, at a curing temperature of 150° F. FIG. 2 illustrates the testing of Comparative Example 2 and Illustrative Examples 4, 5, and 6, designated as "CE-2," "IE-4," "IE-5," and "IE-6" respectively, at a curing temperature of 180° F. FIG. 2 illustrates the testing of Comparative Example 3 and Illustrative Examples 7, 8, and 9, designated as "CE-3," "IE-7," "IE-8," and "IE-9" respectively, at a curing temperature of 220° F.

TABLE 22

UCA Initial Setting Time for Comparative and Inventive Examples.

| Sample | Thickening Time (hours) | | | Final Compressive Strength (psi) | | |
| --- | --- | --- | --- | --- | --- | --- |
| | At 150 °F. | At 180 °F. | At 220 °F. | At 150 °F. | At 180 °F. | At 220 °F. |
| Comparative Examples 1, 2, and 3 | 25 days | 15 days | 9 days | — | 5338 | 5189 |
| Inventive Examples 1, 4, and 7 | 90 | 32 | 13 | 4417 | 4613 | 4877 |
| Inventive Examples 2, 5, and 8 | 21 | 9 | 4 | 5149 | 4518 | 5348 |
| Inventive Examples 3, 6, and 9 | 10 | 4 | 3 | 6105 | 6028 | 3841 |

As illustrated in FIG. 1 and in Table 22, the wellbore fluid, as represented by the Inventive Examples, at 150° F. may have an initial setting time of 10 hours at 1 wt. % BWOC SHMP, 21 hours at 0.75 wt. % SHMP, and 90 hours at 0.5 wt. % BWOC SHMP. Also as illustrated in FIG. 1 and in Table 22, the wellbore fluid at 150° F. may have a final compressive strength of 6105 psi at 1 wt. % BWOC SHMP, 5149 psi at 0.75 wt. % SHMP, and 4417 psi at 0.5 wt. % BWOC SHMP. Also as illustrated in Table 22, the base slurry, as represented by the Comparative Examples, and which may be representative of the wellbore fluid without sodium hexametaphosphate, may have an initial setting time of 25 days at 150° F.

As illustrated in FIG. 2 and in Table 22, the wellbore fluid, as represented by the Inventive Examples, at 180° F. may have an initial setting time of 4 hours at 1 wt. % BWOC SHMP, 9 hours at 0.75 wt. % SHMP, and 32 hours at 0.5 wt. % BWOC SHMP. Also as illustrated in FIG. 2 and in Table 22, the wellbore fluid at 180° F. may have a final compressive strength of 6028 psi at 1 wt. % BWOC SHMP, 4518 psi at 0.75 wt. % SHMP, and 4613 psi at 0.5 wt. % BWOC SHMP. Also as illustrated in FIG. 2 and in Table 22, the base slurry, as represented by the Comparative Examples, and which may be representative of the wellbore fluid without sodium hexametaphosphate, may have an initial setting time of 15 days at 180° F. Also as illustrated in FIG. 2 and in Table 22, the base slurry may have a final compressive strength of 5338 psi at 180° F.

Figure 3:
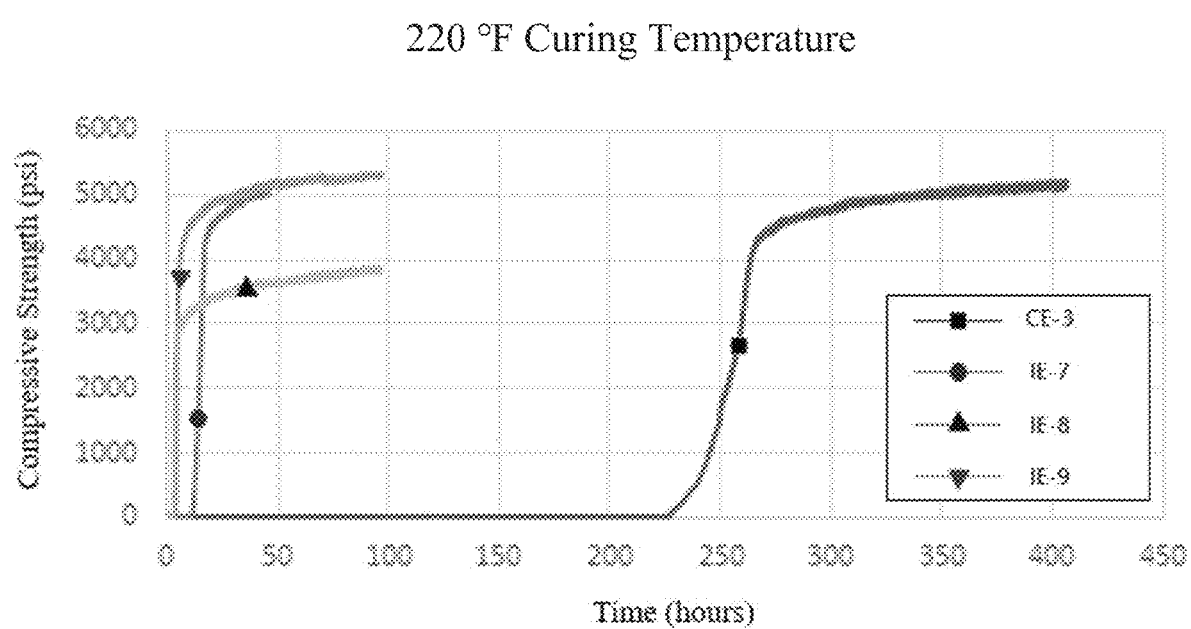
FIG. 3 graphically depicts the relationship between compressive strength and time of multiple wellbore fluids during an ultrasonic cement analyzer curing experiment in which the multiple wellbore fluids were allowed to cure at a constant temperature of 220° F.

As illustrated in FIG. 3 and in Table 22, the wellbore fluid, as represented by the Inventive Examples, at 220° F. may have an initial setting time of 3 hours at 1 wt. % BWOC SHMP, 4 hours at 0.75 wt. % SHMP, and 13 hours at 0.5 wt. % BWOC SHMP. Also as illustrated in FIG. 3 and in Table 22, the wellbore fluid at 150° F. may have a final compressive strength of 3841 psi at 1 wt. % BWOC SHMP, 5348 psi at 0.75 wt. % SHMP, and 4877 psi at 0.5 wt. % BWOC SHMP. Also as illustrated in FIG. 3 and in Table 22, the base slurry, as represented by the Comparative Examples, and which may be representative of the wellbore fluid without sodium hexametaphosphate, may have an initial setting time of 9 days at 220° F. Also as illustrated in FIG. 3 and in Table 22, the base slurry may have a final compressive strength of 5189 psi at 220° F.

As shown in Table 22 and in FIGS. 1-3, the addition of SHMP contributed to a large decrease in the initial setting time of the Inventive Examples, as compared to the Comparative Examples. Higher concentrations of SHMP led to a greater decrease in the initial setting time of the Inventive Examples. Specifically, addition of SHMP at 1 wt. % BWOC led to a decrease in initial setting time of 6000% over the Comparative Examples at 150° F., 9000% over the Comparative Examples at 180° F., and 7200% over the Comparative Examples at 220° F. It is contemplated that this large decrease in the initial setting time of the SHMP may be attributable to the SHMP dissolving the phosphonate-calcium complexes within the wellbore fluid. Increasing amounts of SHMP may result It is contemplated that this large decrease in the initial setting time may allow the wellbore fluid to be initially used as a drilling fluid and positioned into the area to be cemented before being cured as a settable cement when the SHMP interacts with the wellbore fluid.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is also noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative comparison, value, measurement, or other representation.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A wellbore fluid comprising:
    water;
    cementitious material;
    a retarder comprising a phosphonic acid derivative, a sulfonate acrylic acid copolymer, and zinc oxide; and
    an activator comprising from 0.50 to 1 wt. % by weight of cementitious material (BWOC) sodium hexametaphosphate, and wherein
        the wellbore fluid has an initial setting time at 220° F. of from greater than 3 hours and less than 13 hours.

2. The wellbore fluid of claim 1, wherein the wellbore fluid comprises from 0.1 to 1 wt. % by weight of cementitious material (BWOC) zinc oxide.

3. The wellbore fluid of claim 1, wherein the cementitious material comprises Saudi Class G cement, Portland cement, Portland cement clinker, gypsum ($CaSO_4 \cdot 2H_2O$), siliceous fly ash, calcareous fly ash, slag cement, silica fume, calcium hydroxide, silicates, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO \cdot Al_2 \cdot O_3 \ Fe_2O_3$), sodium oxide, potassium oxide, limestone, lime (calcium oxide), hexavalent chromium, calcium aluminate, quartz or combinations thereof.

4. The wellbore fluid of claim 1, wherein the phosphonic acid derivatives comprises diethylenetriamine pentamethylphosphonic acid (DTPMP), nitrilotris(methylene) triphosphonic acid (NTMP), or both.

5. The wellbore fluid of claim 1, wherein the wellbore fluid comprises from 0.4 to 2 wt. % BWOC phosphonic acid derivative.

6. The wellbore fluid of claim 1, wherein the sulfonate acrylic acid copolymer comprises acrylamide-tert-butyl-sulfonate acrylate copolymer (ATBS/AA), 2-acrylamido-methylpropane-sulfonic acid copolymer (AMPS/AA), or both.

7. The wellbore fluid of claim 1, wherein the wellbore fluid comprises 0.4 to 2 wt. % BWOC sulfonate acrylic acid copolymer.

8. The wellbore fluid of claim 1, further comprising a dispersant, wherein the dispersant comprises polycarboxylate ether, polyunsulfonated naphthalene, synthetic sulfonated polymers, lignosulfonates with carboxylate groups, organic acids, hydroxylated sugars, or combinations thereof.

9. The wellbore fluid of claim 1, wherein the wellbore fluid comprises from 0.1 to 1 wt. % BWOC dispersant.

10. A method of setting a wellbore fluid, comprising:
injecting a drilling fluid comprising water, cementitious material, and a retarder comprising a phosphonic acid derivative, a sulfonate acrylic acid copolymer, and zinc oxide into a wellbore;
introducing an activator comprising sodium hexametaphosphate to the drilling fluid to form the wellbore fluid;
allowing the sodium hexametaphosphate to dissolve phosphonate-calcium complexes between the phosphonic acid derivative and the cementitious material, thereby reducing the hydration time; and
allowing the water and cementitious material to react, thereby curing the wellbore fluid and forming a cement with an initial setting time at 220° F. of from greater than 3 hours and less than 13 hours, and wherein the wellbore fluid comprises from 0.50 to 1 wt. % by weight of cementitious material (BWOC) sodium hexametaphosphate.

11. The method of claim 10, wherein the method further comprises:
introducing a casing string into the wellbore, wherein:
the casing string comprises casing pipe, and
the casing string and a wellbore wall of the wellbore define an annular region between the casing string and the wellbore wall; and
allowing the cement to set within the annular region.

12. The method of claim 10, wherein the method further comprises:
introducing a drillstem into the wellbore, the drill stem comprising drill pipe and a downhole drill bit;
circulating the wellbore fluid throughout the wellbore, thereby circulating drill bit cuttings out of the wellbore;
removing the drillstem from the wellbore;
introducing a casing string into the wellbore, wherein:
the casing string comprises casing pipe, and
the casing string and a wellbore wall of the wellbore define an annular region between the casing string and the wellbore wall; and
allowing the cement to set within the annular region.

13. The method of claim 12, wherein circulating the wellbore fluid through the wellbore comprises circulating downhole through the drillstem, circulating uphole through a drilling annulus defined by the exterior of the drillstem and the wellbore wall, and circulating out of the wellbore through an outlet of the wellbore.

14. The method of claim 10, wherein the wellbore fluid comprises from 0.1 to 1 wt. % BWOC zinc oxide.

15. The method of claim 10, wherein the wellbore fluid comprises from 0.4 to 2 wt. % BWOC phosphonic acid derivative.

16. The method of claim 10, wherein the wellbore fluid comprises 0.4 to 2 wt. % BWOC sulfonate acrylic acid copolymer.

* * * * *